US007267217B2

(12) United States Patent
Kinoshita et al.

(10) Patent No.: US 7,267,217 B2
(45) Date of Patent: Sep. 11, 2007

(54) APPARATUS AND METHOD FOR DETECTING REMOVAL OF CONVEYED WORK

(75) Inventors: Yoshiaki Kinoshita, Hata-machi (JP); Akihiro Ikeda, Tsumi (JP); Noboru Usui, Ueda (JP); Yuji Takiguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/341,241

(22) Filed: Jan. 26, 2006

(65) Prior Publication Data

US 2006/0171759 A1 Aug. 3, 2006

(30) Foreign Application Priority Data

Jan. 28, 2005 (JP) ............................ 2005-021446

(51) Int. Cl.
*B65G 43/08* (2006.01)

(52) U.S. Cl. .................... 198/572; 198/464.2; 271/259

(58) Field of Classification Search ................ 198/571, 198/572, 574, 575, 576, 577, 464.2; 271/3.17, 271/4.02, 110, 259, 265.02
See application file for complete search history.

(56) References Cited

U.S. PATENT DOCUMENTS

| | | | | |
|---|---|---|---|---|
| 4,732,261 | A * | 3/1988 | Mattern et al. | 198/572 |
| 4,765,607 | A * | 8/1988 | Zouzoulas | 271/177 |
| 5,078,379 | A * | 1/1992 | Leisner | 271/3.04 |
| 5,280,896 | A * | 1/1994 | Yamada | 198/577 |
| 5,915,681 | A * | 6/1999 | Milne | 198/577 |
| 6,405,851 | B1 * | 6/2002 | Takeda | 198/575 |
| 6,572,103 | B1 * | 6/2003 | Tranquilla | 271/265.02 |
| 6,913,259 | B2 * | 7/2005 | Phinney et al. | 271/259 |
| 6,978,192 | B2 * | 12/2005 | Wisniewski | 198/575 |
| 2002/0105669 | A1 | 8/2002 | Watanabe et al. | |

FOREIGN PATENT DOCUMENTS

| | | |
|---|---|---|
| JP | 60-204549 | 10/1985 |
| JP | 61-127083 | 6/1986 |
| JP | 64-26741 | 2/1989 |
| JP | 06-019640 | 1/1994 |
| JP | 07-196237 | 8/1995 |
| JP | 08-185551 | 7/1996 |
| JP | 09-267539 | 10/1997 |
| JP | 10-044554 | 2/1998 |
| JP | 2000-020274 | 1/2000 |
| JP | 2002-326404 | 11/2002 |
| JP | 2004-017487 | 1/2004 |
| JP | 2004-315142 | 11/2004 |

* cited by examiner

*Primary Examiner*—James R Bidwell
(74) *Attorney, Agent, or Firm*—John J. Penny, Jr.; Edwards Angell Palmer & Dodge LLP

(57) ABSTRACT

An apparatus comprising a first detector for detecting if conveyed work that has passed or is passing a specific position is or is not present at a first position; a calculator for calculating a distance traveled by the conveyed work based on the specific position; and an evaluator that determines the conveyed work was removed if the first detector does not detect the conveyed work when the conveyed work is determined to be present at the first position based on the calculated traveled distance.

14 Claims, 9 Drawing Sheets

APPARATUS AND METHOD FOR DETECTING REMOVAL OF CONVEYED WORK

Japanese Patent Application 2005-021446 filed on Jan. 28, 2005 is hereby incorporated by reference in its entirety.

BACKGROUND OF THE INVENTION

1. Field of Technology

The present invention relates to technology for detecting removal of conveyed work.

2. Description of Related Art

Paper, CD-ROM discs, and other printed media are examples of conveyed work as used below. Japanese Unexamined Patent Appl. Pub. 2000-20274 teaches a method of using a sensor for detecting print media (referred to below as a "print media sensor") to measure the width of the print medium (the length of the transverse direction perpendicular to the transportation direction) in a printer. Japanese Unexamined Patent Appl. Pub. H06-19640 similarly teaches a method of using a print media sensor to detect if a print medium is present at a specific location in the print media transportation path of the printer.

Sometimes, however, the print medium is pulled out of the transportation path by force. A means of detecting if the print medium has been removed in this way at any point in the print media transportation path is therefore desirable. This can be done by, for example, using a plurality of these print media sensors located at intervals less than the length (in the direction in which the print media are conveyed) of the print media supported by the printer.

The internal arrangement of the printer, cost considerations, and other problems, however, mean that the above methods cannot always be used. A conventional printer of this type therefore usually cannot detect if the print medium has been removed from any point in the transportation path. The inability to detect if the print medium has been removed can result in problems such as described below.

(1) Printing proceeds on the assumption that the print medium is present, and the printing process thus ends as though the print data (text or image, for example) was actually printed even though the print data was not printed on the print medium.

(2) Because printing proceeds as though the print medium is present, the ink or other printing material is deposited on the transportation path. The platen can even be damaged in a dot impact printer as a result of the pins firing directly against the platen with no intervening paper.

The ability to detect in as many situations as possible if the work being conveyed has been removed during transportation is desirable regardless of the type of work being conveyed, and is not limited to print media.

A first embodiment of the invention described herein therefore enables detecting in as many situations as possible if an object being conveyed has been removed during transportation.

Other aspects and effects of the present invention will be known from the description of the invention following below.

SUMMARY OF THE INVENTION

An apparatus according to a first embodiment of the invention for conveying work sequentially passed a first position and second position to at least a specific position, has: a first detector for detecting if the conveyed work is or is not present at the first position; a second detector for detecting if the conveyed work that has passed or is passing the first position is or is not present at the second position; a first calculator for calculating a first distance traveled by the conveyed work after the conveyed work is known from a detection result of the first detector to have passed the first position; a second calculator for calculating a second distance traveled by the conveyed work after the conveyed work is known from a detection result of the second detector to have passed the second position; and an evaluator for determining, after the presence of the conveyed work is no longer detected at the second position, if the conveyed work was or was not removed when the conveyed work was present at least at the second position based on the calculated first traveled distance and the calculated second traveled distance.

An apparatus according to a second embodiment of the invention is the apparatus according to the first embodiment of the invention wherein the first calculator calculates as the first traveled distance the distance the conveyed work moves from when the first detector stops detecting the conveyed work until the leading end of the conveyed work reaches the specific position; the second calculator calculates as the second traveled distance the distance the conveyed work moves from when the second detector stops detecting the conveyed work until the leading end of the conveyed work reaches the specific position; and the evaluator compares the difference of the calculated first traveled distance minus the calculated second traveled distance with the gap between the first position and the second position, and determines that the conveyed work was removed if this difference is less than the gap.

An apparatus according to a third embodiment of the invention is the apparatus according to the second embodiment of the invention wherein the length of the conveyed work along the transportation direction is shorter than the distance between the second position and the specific position; and the evaluator compares the difference and the gap when the leading end of the conveyed work is expected to reach the specific position.

An apparatus according to a fourth embodiment of the invention is the apparatus according to the first embodiment of the invention further comprising a third detector for detecting if the conveyed work that has passed or is passing a specific position is or is not present at a third position; a third calculator for calculating a third distance traveled by the conveyed work referenced to the specific position; and a second evaluator for determining that the conveyed work was removed if the third detector does not detect the conveyed work even though the conveyed work is determined present at the third position based on the calculated third traveled distance.

An apparatus according to a fifth embodiment of the invention is the apparatus according to the first embodiment of the invention further comprising a third calculator for calculating a third distance travelled by the conveyed work from the specific position; and a second evaluator for determining that the conveyed work was removed if the second detector does not detect the conveyed work even though the conveyed work is determined present at the second position based on the calculated third travelled distance and the length of the conveyed work in the transportation direction.

An apparatus according to a sixth embodiment of the invention is the apparatus according to the fifth embodiment of the invention wherein the length of the conveyed work in the transportation direction is acquired based on detection results from the first detector and the second detector.

An apparatus according to a seventh embodiment of the invention is the apparatus according to the first embodiment of the invention further comprising a second evaluator for determining that the conveyed work was removed if the second detector does not detect the conveyed work even though the conveyed work is determined present at the second position based on the calculated first travelled distance.

An apparatus according to an eighth embodiment of the invention is the apparatus according to the first embodiment of the invention wherein the first calculator calculates the distance moved by the conveyed work from when the first detector detects the conveyed work to when the first detector stops detecting the conveyed work as the first traveled distance; the second calculator calculates the distance moved by the conveyed work from when the second detector detects the conveyed work to when the second detector stops detecting the conveyed work as the second traveled distance; and the evaluator determines that the conveyed work was removed if the calculated second traveled distance is shorter than the calculated first traveled distance.

An apparatus according to a ninth embodiment of the invention has a first detector for detecting if conveyed work that has passed or is passing a specific position is or is not present at a first position; a calculator for calculating a distance traveled by the conveyed work based on the specific position; and an evaluator that determines the conveyed work was removed if the first detector does not detect the conveyed work when the conveyed work is determined to be present at the first position based on the calculated traveled distance.

An apparatus according to a tenth embodiment of the invention is the apparatus according to the ninth embodiment of the invention further comprising a second detector for detecting if the conveyed work is or is not present at a second position; wherein the evaluator determines that the conveyed work was removed if the second detector does not detect the conveyed work when the conveyed work is determined to be present at the second position based on the calculated travelled distance and the length of the conveyed work in the transportation direction.

An apparatus according to an eleventh embodiment of the invention is the apparatus according to the eighth embodiment of the invention wherein the first detector is located downstream of the second detector in the transportation direction.

An apparatus according to a twelfth embodiment of the invention is the apparatus according to the ninth embodiment of the invention wherein the first detector is a discharge detector for detecting the leading end of the conveyed work after the conveyed work passes the specific position; and the second detector is a top-of-form detector for detecting the trailing end of the conveyed work after the conveyed work passes the specific position.

An apparatus according to a thirteenth embodiment of the invention is the apparatus according to any of the first to twelfth embodiments of the invention wherein the apparatus is connected to enable communication with a host device; and the evaluator, or the second evaluator determines if the conveyed work is or is not removed according to a command that is sent from the host device to enable or disable a removal detection function.

A fourteenth embodiment of the invention is a method of conveying work sequentially passed a first position and second position to at least a specific position, comprising steps of: detecting if the conveyed work is or is not present at the first position; detecting if the conveyed work that has passed or is passing the first position is or is not present at the second position; calculating a first distance travelled by the conveyed work when the conveyed work passes or has passed the first position; calculating a second distance travelled by the conveyed work when the conveyed work passes or has passed the second position; and determining if the conveyed work was or was not removed when the conveyed work was present at the second position based on the calculated first travelled distance and the calculated second travelled distance after the presence of the conveyed work is no longer detected at the second position.

A fifteenth embodiment of the invention is a method comprising steps of: detecting if a conveyed work that was conveyed to a specific position and has passed or is passing the specific position is or is not present at a target position; calculating a first traveled distance, which is the distance traveled by the conveyed work from the specific position; and determining that the conveyed work was removed if the conveyed work is not detected when the conveyed work is determined present at the target position based on the calculated first traveled distance.

A sixteenth embodiment of the invention is the method according to the fifteenth embodiment of the invention wherein the specific position is an indexing position of the conveyed work, and the target position is the detection position of a discharge detector that detects discharging the conveyed work.

A seventeenth embodiment of the invention is the method according to the fifteenth embodiment of the invention wherein the specific position and the target position are the detection position of a bottom-of-form detector that detects the trailing end of the conveyed work.

The apparatus and method of the present invention thus appropriately determine if conveyed work, such as paper in a printer, has been removed while the work is being conveyed and can continue appropriately processing the work based on whether or not the work was removed without executing unnecessary operations, such as transporting the work and associated processes even though the work being conveyed and processed is not present.

If the conveyed work is "present at least at the second position," the conveyed work might be present only at the second position or the work might be present at both the second position and first position.

"Conveyed work" denotes any object that is conveyed. The conveyed work might therefore be a flat two-dimensional object such as paper, or a three-dimensional object such as a box.

Furthermore, the "first position," "second position," and "specific position" can be positions along the transportation path of the conveyed work.

The conveyed work can be transported continuously without stopping after reaching the specific position, or the conveyed work can be stopped after being conveyed to a specific position before continuing to transport the work.

This "specific position" is preferably the indexing position when the work is indexed to a particular position and the length of the conveyed work is less than or equal to the distance between the index position and the second position.

If the length of the conveyed work is greater than the distance between the index position and the second position, the leading end of the paper that is the conveyed work is at the index position, the conveyed work is still at the second position, and the paper (work) is then removed when the work should still be at the second position, the specific position is preferably rendered at a location downstream from the index position (at a virtual position between the index position and the third detection position).

When the work is indexed to a particular position, the "specific position" is preferably the index position or a position downstream from the index position. It should be noted, however, that this specific position is simply a reference position for detecting the conveyed work. The location of the specific position is therefore not specifically limited and the specific position can be rendered at any suitable location.

The "target position" can be downstream or upstream in the transportation direction from the specific position. If the target position is downstream from the specific position, the evaluator can determine if, for example, the leading end of the conveyed work is or is not present at the target position. If the target position is upstream from the specific position, the evaluator can, for example, determine if the trailing end of the conveyed work is or is not present at the target position.

The means of the apparatus of the invention described herein can be rendered in hardware, a computer program, or a combination of hardware and software. The processes of these means can also be executed by a single element (such as hardware, a computer program, or a combination of hardware and software) or by a plurality of elements.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
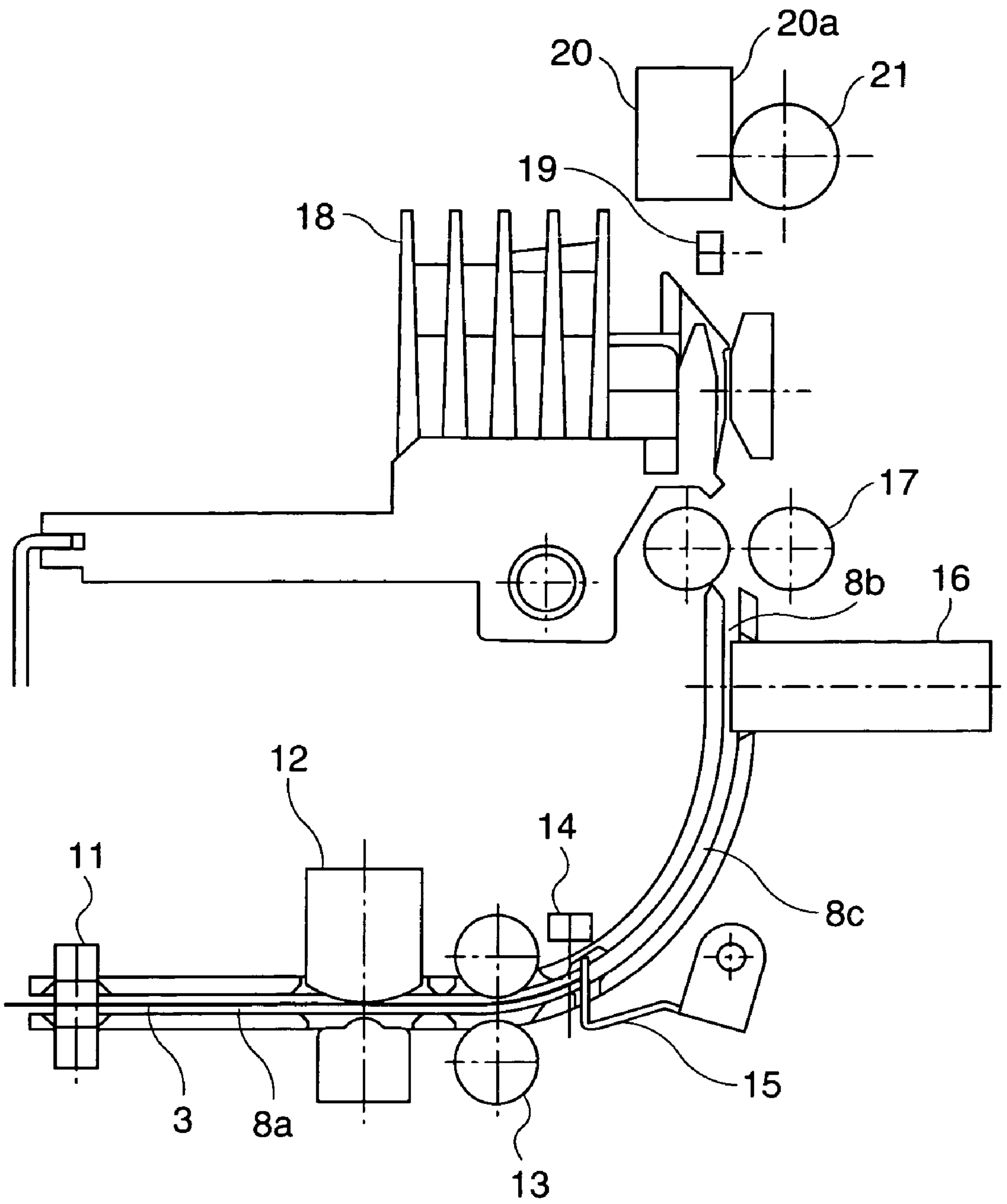
FIG. 1 is a schematic section view of a part of the print media transportation path in a printer according to a preferred embodiment of the present invention.

FIG. 1 is a schematic section view of a part of the print media transportation path in a printer according to a preferred embodiment of the present invention.

A paper transportation path 8 conveys paper 3 (such as checks and other slips) from the paper 3 insertion slot to the paper 3 exit in a printing apparatus such as a check printer used to print both sides of checks in a check processing system. The paper transportation path 8 typically has horizontal path 8*a* on the paper insertion side (that is, the upstream side of the path) communicating with a vertical path 8*b* on the paper exit side (that is, the downstream side of the path) through an intervening arc-shaped curved path 8*c*, thus forming a continuous paper transportation path 8.

Disposed in order along this paper transportation path 8 from the upstream side to the downstream side are a first paper detector 11, MICR head (magnetic head) 12, first feed roller pair 13, second paper detector 14, paper positioning member 15, back print head 16, second feed roller pair 17, front print head 18, third paper detector 19, and scanner 20. A scanner feed roller 51 for conveying the paper 3 while pressing the paper 3 to the scanning surface 20*a* of the scanner 20 is rendered at an appropriate position opposite the scanning surface 20*a*.

The first paper detector 11 is a transmission type photosensor, and the second paper detector 14 and third paper detector 19 are reflection type photosensors, for example, and each of the detectors 11, 14, 19 contactlessly detects if the paper 3 is present at a specific location on the paper transportation path 8. It will be obvious to one with ordinary skill in the related art that the detectors 11, 14, 19 are not limited to these types of sensors.

The paper positioning member 15 causes paper 3 inserted from the insertion slot to stop briefly at a specific position on the upstream side of the indexing position that is further described below. The paper positioning member 15 is driven by a solenoid or other actuator to move between a work position where the paper positioning member 15 protrudes into the paper transportation path 8 and a retracted position where the paper positioning member 15 is removed from the paper transportation path 8. In other words, the paper positioning member 15 is a paper stop that prevents the paper 3 from travelling downstream from this specific position.

The first feed roller pair 13 is a pair of opposing rollers disposed on opposite sides of the horizontal path 8*a* portion of the paper transportation path 8 for conveying the paper 3 in the forward direction from the upstream side to the downstream side of the paper transportation path 8, or in the opposite direction, by driving at least one of the rollers. The second feed roller pair 17 is similarly configured.

The MICR head 12 is used for reading magnetic ink characters recorded on the front of the paper 3 when the paper 3 is a check, for example. If a check is being processed as paper 3, whether the check is valid or not can be confirmed using the data read by the MICR head 12.

The front print head 18 prints specific content on the front of the paper 3. If the paper 3 is a check, the content printed by the front print head 18 typically includes the payee, the date, and the amount of the check. The front print head 18 is, for example, a serial print head that is mounted on a carriage and prints a dot matrix one or multiple lines at a time while travelling widthwise to the paper 3 (referred to herein as the "main scanning direction"). A dot impact type print head that transfers ink from an ink ribbon to the paper 3 is used by way of example as the front print head 18 in this embodiment of the invention, but the invention shall not be so limited and a different type of print head can be used.

The back print head 16 prints specific content on the back of the paper 3. If the paper 3 is a check, the back print head 16 typically prints endorsement information such as a customer verification number or check authorization number, the date, the check amount, and other endorsement information needed by the business that receives the check. The back print head 16 is, for example, a shuttle style print head having a plurality of heads disposed with a specific gap therebetween widthwise to the paper 3 and printing a dot matrix one or multiple lines at a time while travelling within this gap between the heads. A dot impact type print head that transfers ink from an ink ribbon to the paper 3 is used by way of example as the back print head 16 in this embodiment of the invention, but the invention shall not be so limited and a different type of print head can be used.

The scanner 20 scans the front of the printed paper 3. The scanning image data is then compressed (or not compressed), sent to and stored by a host computer (not shown in the figure) that is connected to the printer, and used for electronic transaction processing.

Figure 2:
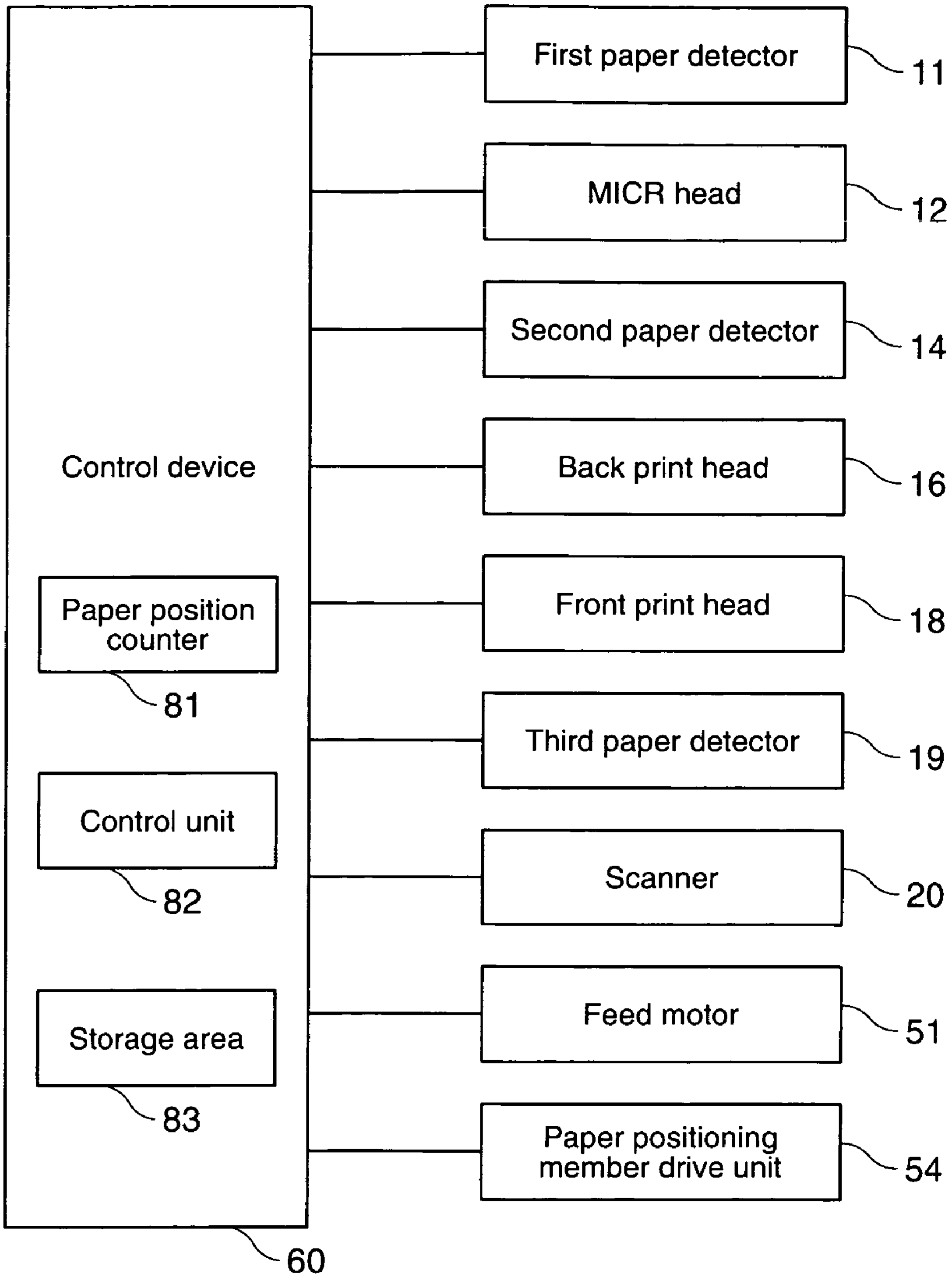
FIG. 2 is a block diagram of the control system of a printer according to a preferred embodiment of the invention.

FIG. 2 is a block diagram of the control system of a printer according to this embodiment of the invention.

As shown in FIG. 2, this printer has a control device 60. In addition to the first paper detector 11, MICR head 12, second paper detector 14, back print head 16, front print head 18, third paper detector 19, and scanner 20 described above, a feed motor 51 and paper positioning member drive unit 54 are also connected to the control device 60.

The feed motor 51 drives the first feed roller pair 13 and second feed roller pair 17 to convey the paper 3 in the forward or reverse direction.

The paper positioning member drive unit 54 is an actuator, for example, for driving the paper positioning member 15 into the paper transportation path 8 and retracting the paper positioning member 15 from the paper transportation path 8.

The control device 60 additionally has a paper position counter 81, control unit 82 such as a CPU, and storage area 83 (such as volatile or nonvolatile rewritable memory).

The paper position counter 81 updates the counter based on a measure of driving the feed motor 21, such as how long the feed motor 21 drives the feed rollers or the output of a rotary encoder. In practice, the counter increments when driving in the forward direction and decrements when driving in the reverse direction.

The control unit 82 calculates the position of the paper 3 in the paper transportation path 8 (referred to below as the "paper position") based on the value of the paper position counter 81 and output from the paper detectors 11, 14, 19, and writes the calculated paper position to storage area 83.

The basic arrangement of a printer according to the present invention is described above. Main parts of this embodiment of the invention are described in further detail below.

The paper transportation path 8 of a printer according to this embodiment of the invention is described below with reference to FIG. 3.

Figure 3:
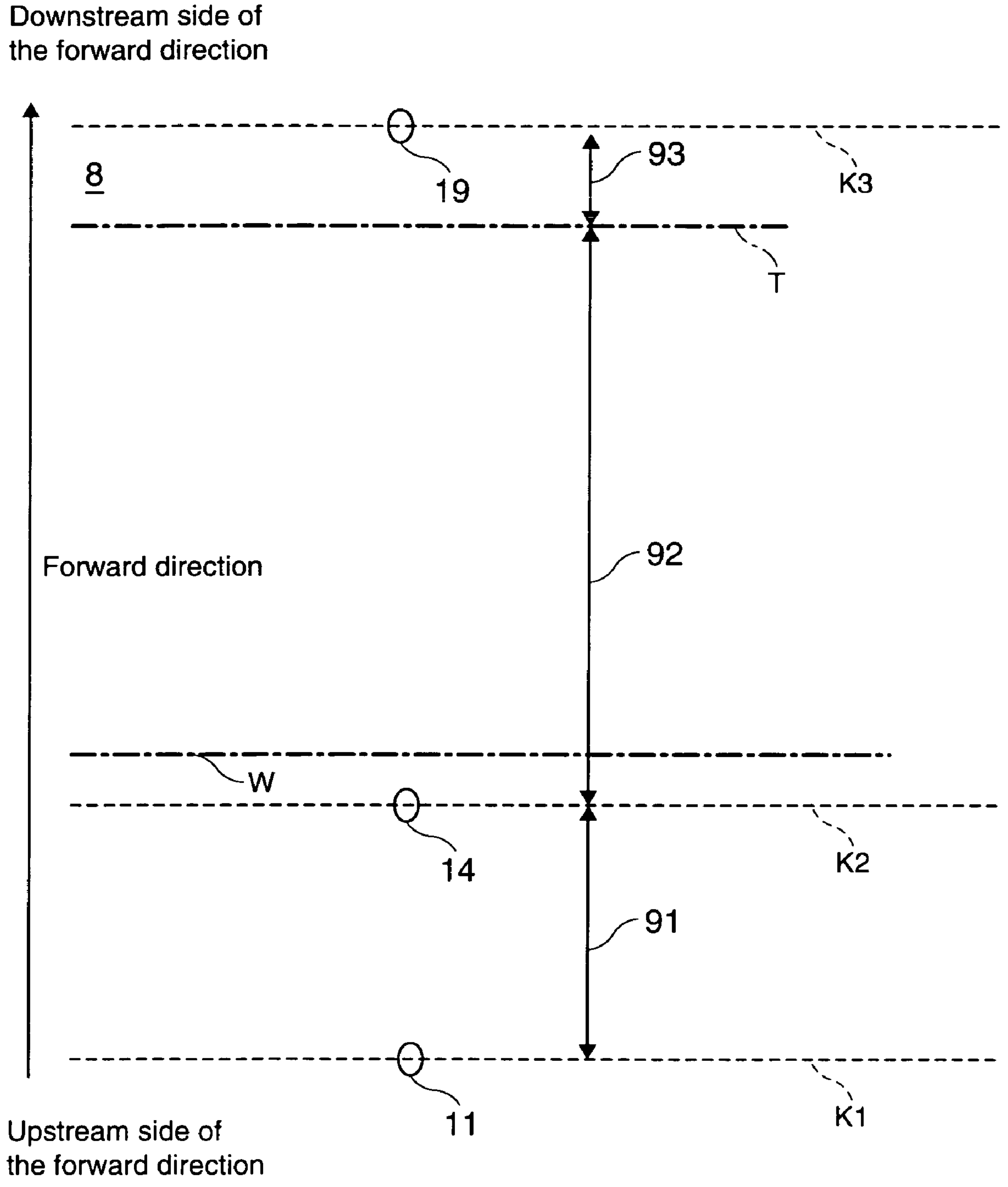
FIG. 3 describes the paper transportation path 8 in a printer according to a preferred embodiment of the invention.

FIG. 3 schematically illustrates the paper transportation path 8 as seen from the front (upstream side) to the back (downstream side) end of the path. A check or other paper 3 travelling through this paper transportation path 8 thus moves over the surface of FIG. 3 (that is, on top of the drawing) while the first feed roller pair 13 moves bidirectionally above FIG. 3 (that is, above the surface of the drawing) in the main scanning direction at a right angle to the transportation direction (the forward direction in this example) of the paper 3 while printing on the paper 3.

The paper transportation path 8 is divided into a plurality of zones delimited by a plurality of virtual lines parallel to the main scanning direction. In this embodiment of the invention there are three logically discrete zones 91, 92, and 93 delimited by virtual lines K1, K2, K3.

The first zone 91 is the area between first paper detection line K1 and second paper detection line K2. The first paper detection line K1 is a line through a position detected by the first paper detector 11, and the second paper detection line K2 is a line through a position detected by the second paper detector 14.

The second zone 92 is the area between the second paper detection line K2 and paper indexing line T, which is a line through the paper indexing position.

The third zone 93 is the area between the paper indexing line T and the third paper detection line K3, which is a line through a position detected by the third paper detector 19.

Position information (such as the coordinates of K1 in the transportation direction) relating to the first paper detection line K1, position information relating to the second paper detection line K2, position information relating to the third paper detection line K3, position information relating to the paper indexing line T, position information relating to the paper positioning line W further described below, and the values of lengths L1 and L2 further described below are stored in storage area 83, for example, and can be referenced by the control unit 82.

Figure 4:
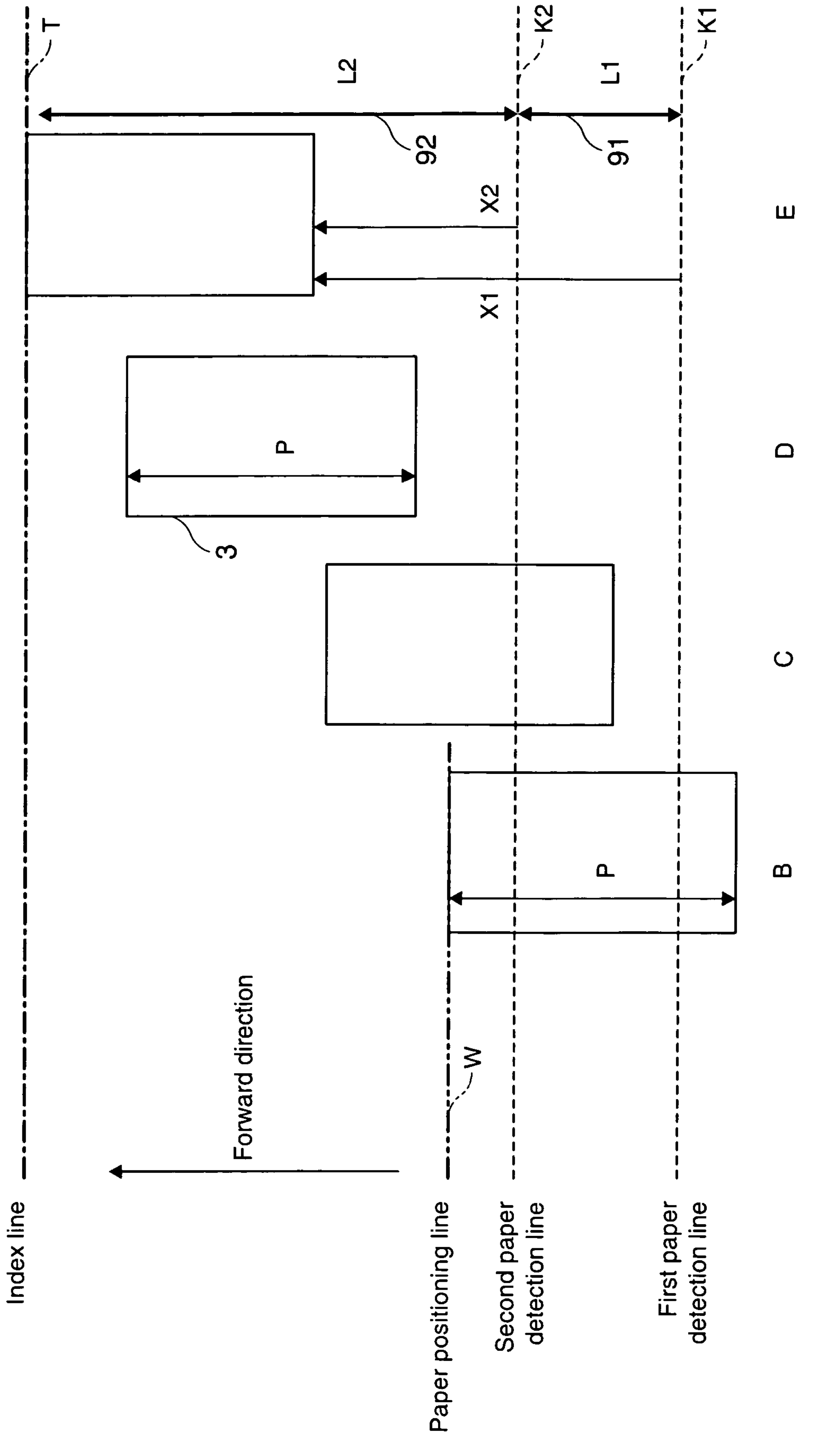
FIG. 4 describes advancement of the paper 3 in the forward direction through the transportation path.

When paper 3 is inserted from the insertion slot, the paper 3 is conveyed along the paper transportation path 8 to the paper indexing line T as controlled by the control unit 82 and shown in FIG. 4.

The control device 60 drives the paper positioning member 15 into the paper transportation path 8 before the paper is inserted, such as before the first paper detector 11 detects paper 3.

When both the first paper detector 11 and the second paper detector 14 detect that paper 3 is present, the control unit 82 determines that paper 3 was inserted and closes the first feed roller pair 13 to clamp the paper 3, and then retracts the paper positioning member 15 from the paper transportation path 8.

The paper 3 is thus positioned at position B in FIG. 4 as a result of the operator inserting the paper 3 in the downstream direction of the transportation path until the paper 3 is stopped by the paper positioning member 15.

Transporting the paper 3 starts from this position.

The control unit 82 then drives the feed motor 21 to advance the leading end of the paper 3 from paper positioning line W to paper indexing line T (positions C to E in FIG. 4). When the leading end of the paper 3 reaches the paper indexing line T, the paper 3 is paused and this line is used as the starting line for printing using the front print head 18.

When the leading end of the paper 3 reaches the first paper detection line K1 shown in FIG. 4, the control unit 82 detects from the output signal of the first paper detector 11 that paper detection at the first paper detection line K1 changed from the no-paper state to the paper-detected state. When the trailing end of the paper 3 passes the first paper detection line K1, the control unit 82 detects from the output signal of the first paper detector 11 that paper detection at the first paper detection line K1 changed from the paper-detected state to the no-paper state. Paper detection at the second paper detection line K2 and third paper detection line K3 is similarly detected.

A printer according to this embodiment of the invention supports paper 3 of various different lengths P, including a length P (such as 68 mm) that is less than the length L2 (such as 88.3 mm) of second zone 92 as shown in FIG. 4.

The control unit 82 can detect that the paper 3 has been removed from the paper transportation path 8 in this case if the second paper detector 14 does not detect the paper 3 when the feed motor 51 has been driven a certain amount (such as a specific distance or a specific time) after the first paper detector 11 has detected the paper 3 (that is, output the paper-detected signal).

The control unit 82 can also determine that the paper 3 was removed if a no-paper signal is received simultaneously or substantially simultaneously from both the first paper detector 11 and second paper detector 14. This enables detecting that the paper 3 was removed when the paper 3 is positioned as indicated by B in FIG. 4, that is, so that both the first paper detector 11 and the second paper detector 14 detect the paper.

This aspect of this embodiment of the invention can thus detect if the paper 3 was removed from position B shown in FIG. 4 before printing starts even if the length P of the paper 3 is less than length L2, and can therefore prevent printing when there is no paper 3 to print on.

As described above, however, if the length P of the paper 3 is less than length L2, the prior art cannot detect if the paper 3 is removed when the paper 3 is detected only by the second paper detector 14, that is, when the paper 3 is located with the leading end of the paper 3 in the second zone 92 and the trailing end of the paper 3 in the first zone 91. This is because the prior art does not know if the paper 3 was removed during transportation or if the trailing end of the paper 3 has passed the second paper detection line K2 as a result of advancing the paper 3 in the forward direction.

This embodiment of the invention runs the process described below to solve this problem and detect if the paper 3 was removed when the paper 3 is detected only by the second paper detector 14.

Figure 5:
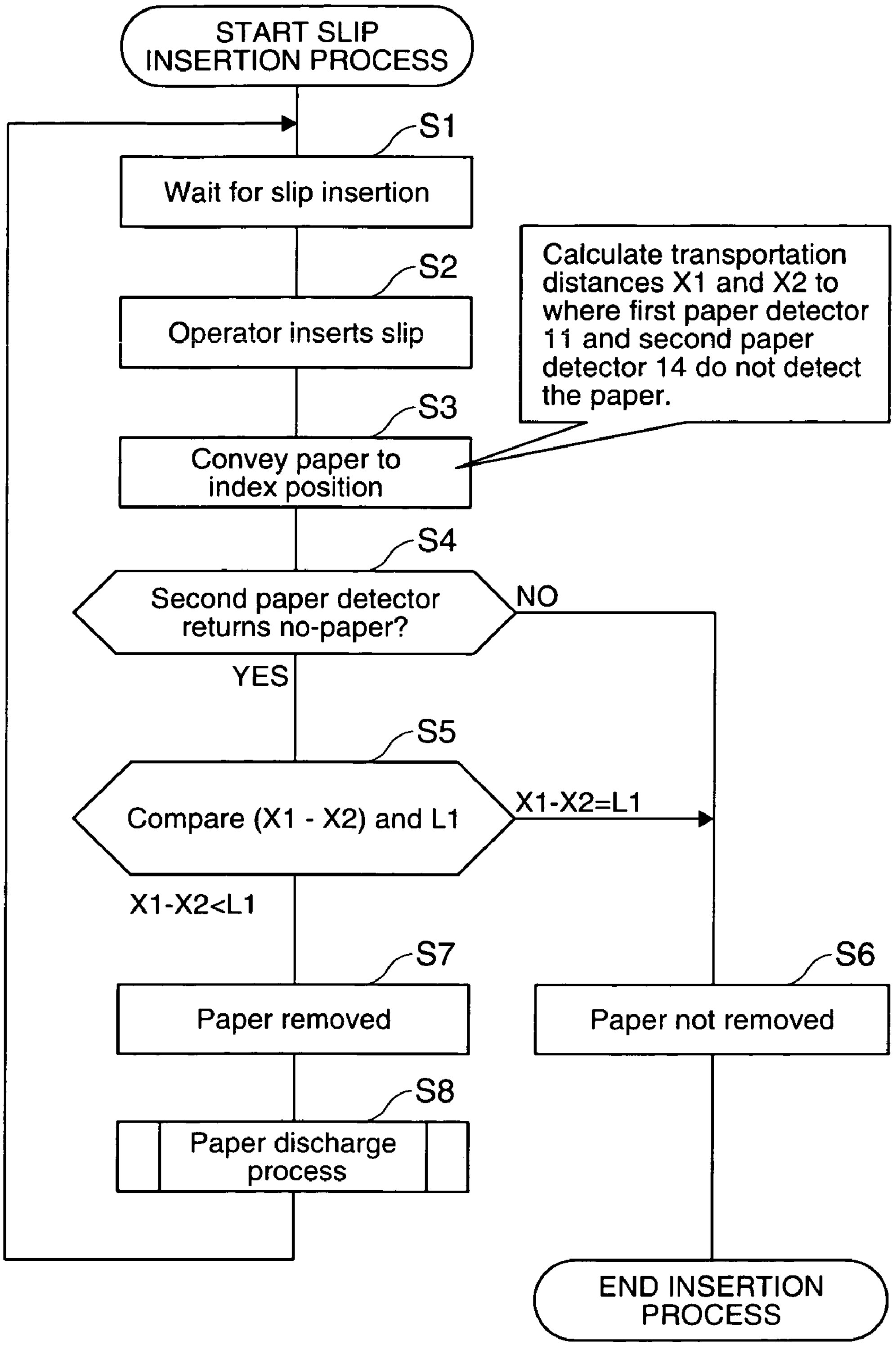
FIG. 5 is a flow chart of a process for detecting if the paper 3 is removed when the paper 3 is detected by the second paper detector 14.

FIG. 5 is a flow chart of a process for detecting if the paper 3 is removed when the paper 3 is detected only by the second paper detector 14. This process is described below with reference to FIG. 5 and FIG. 4.

If the printer is in a standby state waiting for paper 3 to be inserted (S1) and the control unit 82 detects that the operator inserted paper 3 (S2), the paper 3 is conveyed to the paper indexing line T (S3).

During step S3 the control unit 82 calculates and writes the first distance X1 to storage area 83. This first distance X1 is the distance travelled by the paper 3 in order for the leading end of the paper 3 to reach a specific position (paper indexing line T in this embodiment of the invention) after the first paper detector 11 goes from the paper-detected state to the no-paper state (that is, after the trailing end of the paper 3 passes the first paper detection line K1).

Whether the leading end of the paper 3 has reached the paper indexing line T can be determined from the change (the increase) in the count of the paper position counter 81 from the paper positioning line W.

In addition, the first distance X1 can be calculated from the change (the increase) in the count of the paper position counter 81 after the no-paper signal is received from the first paper detector 11.

During step S3 the control unit 82 also calculates and writes second distance X2 to storage area 83. This second distance X2 is the distance travelled by paper 3 in order for the leading end of the paper 3 to reach the paper indexing line T after the second paper detector 14 goes from the paper-detected state to the no-paper state (that is, after the trailing end of the paper 3 passes the second paper detection line K2).

The second distance X2 can be calculated from the change (the increase) in the count of the paper position counter 81 after the no-paper signal is received from the second paper detector 14.

If the leading end of the paper 3 has advanced to the paper indexing line T and the second paper detector 14 outputs the no-paper signal (S4 returns Yes), the control unit 82 compares the difference between first distance X1 and second distance X2 with the length L1 (stored in storage area 83) of the first zone 91 (S5).

If the leading end of the paper 3 is conveyed to the paper indexing line T without the paper 3 being removed from position C, the difference (X1−X2) is equal to length L1 as shown in FIG. 4. Therefore, if the result of step S5 is that (X1−X2)=L1, the control unit 82 determines that the paper 3 was not removed (S6) and terminates the paper insertion process. This paper insertion process indexes the leading end of the paper 3 to the paper indexing line T so that printing can start.

Figure 6:
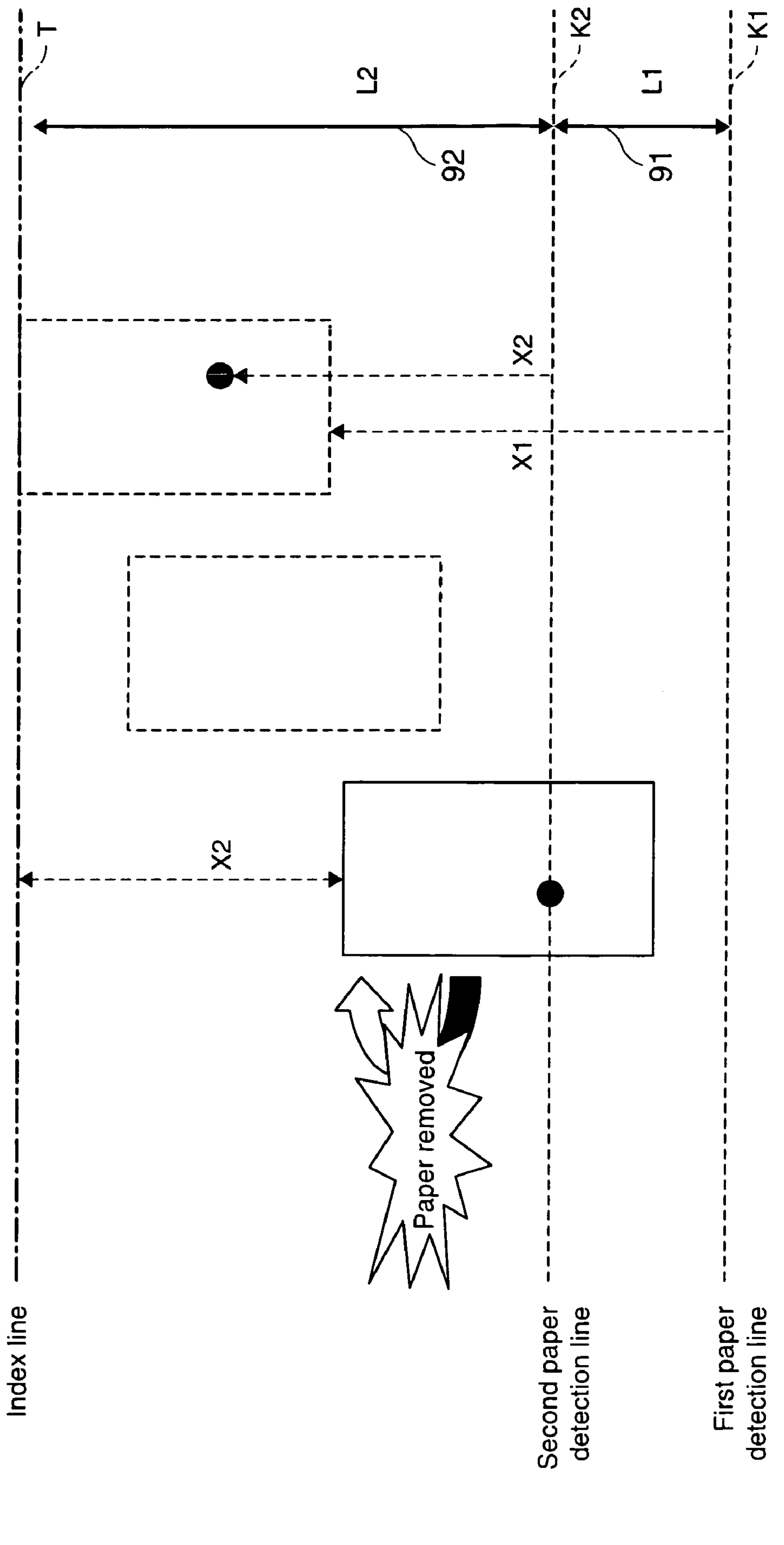
FIG. 6 describes removal of the paper 3 when the paper 3 is positioned as indicated by C in the figure.

If the paper 3 is removed from position C as indicated in FIG. 6, however, the difference (X1−X2) will be a value less than length L1. Therefore, if the result of step S5 is that (X1−X2)<L1, the control unit 82 determines that the paper 3 was removed (S7), runs a specific process such as a paper discharge process (S8), and then loops back to wait again for paper insertion (S1).

The process for detecting if the paper 3 was removed is described above. This process can detect removal of the paper 3 in more situations than the prior art can. Furthermore, if a signal indicating that paper is present is received from the second paper detector 14 when the leading end of the paper is positioned at the paper indexing line T (S4 returns No) in the process described above, the length of the paper 3 is greater than length L2 and the control unit 82 can thus determine that the paper 3 was not removed (S6) as shown in FIG. 5.

After the leading end of the paper 3 is positioned at the paper indexing line T and the control unit 82 confirms that the paper 3 was not removed, the control unit 82 starts advancing the paper 3 from the paper indexing line T and starts printing on the paper 3. The control unit 82 then runs the monitoring process shown in FIG. 7 at a regular interval (or not regularly) to monitor if the paper 3 is pulled out from the paper transportation path 8 after printing starts.

Figure 7:
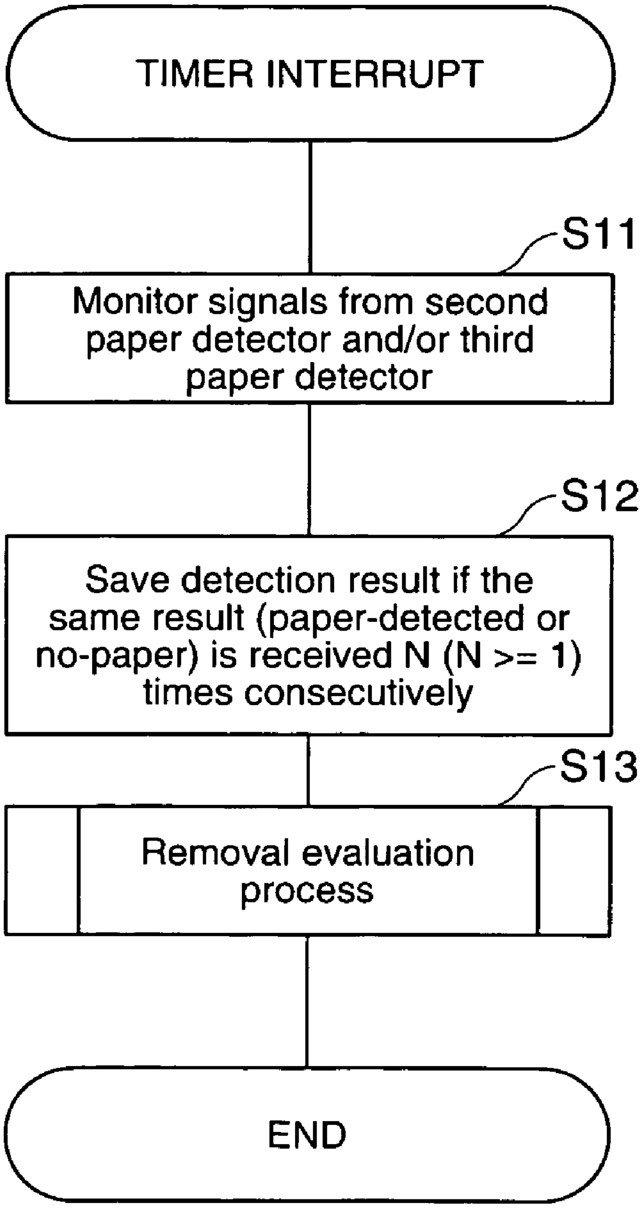
FIG. 7 is a flow chart of the monitoring process that runs after printing starts.

The monitoring process run after printing starts is described next below with reference to FIG. 7.

The control unit 82 regularly asserts an interrupt, for example, to monitor whether a signal was received from at least one of the second paper detector 14 and third paper detector 19 (S11). If the control unit 82 receives signals denoting the same detection result (paper-detected or no-paper) N times consecutively (where N>=1 and preferably N>=2) from the same paper detector 14 and/or 19, the control unit 82 saves the detection result (by writing the detection result to storage area 83, for example) (S12) and then runs the media removal evaluation process (S13).

Note that preferably N>=2 because the wrong state (paper-detected or no-paper) can be detected due to noise or other external disturbance if the paper-detected or no-paper state is detected from only one detection signal, in which case detection reliability drops. By preferably saving the detection result when the same result is received at least twice consecutively from the same paper detector, this aspect of this embodiment of the invention eliminates transient detection errors caused by noise or other external disturbance and can thus acquire an accurate detection result even if the precision of the second and third paper detectors 14 and 19 is low (such as if reflection type photosensors are used instead of transmission type photosensors as noted above).

Figure 8:
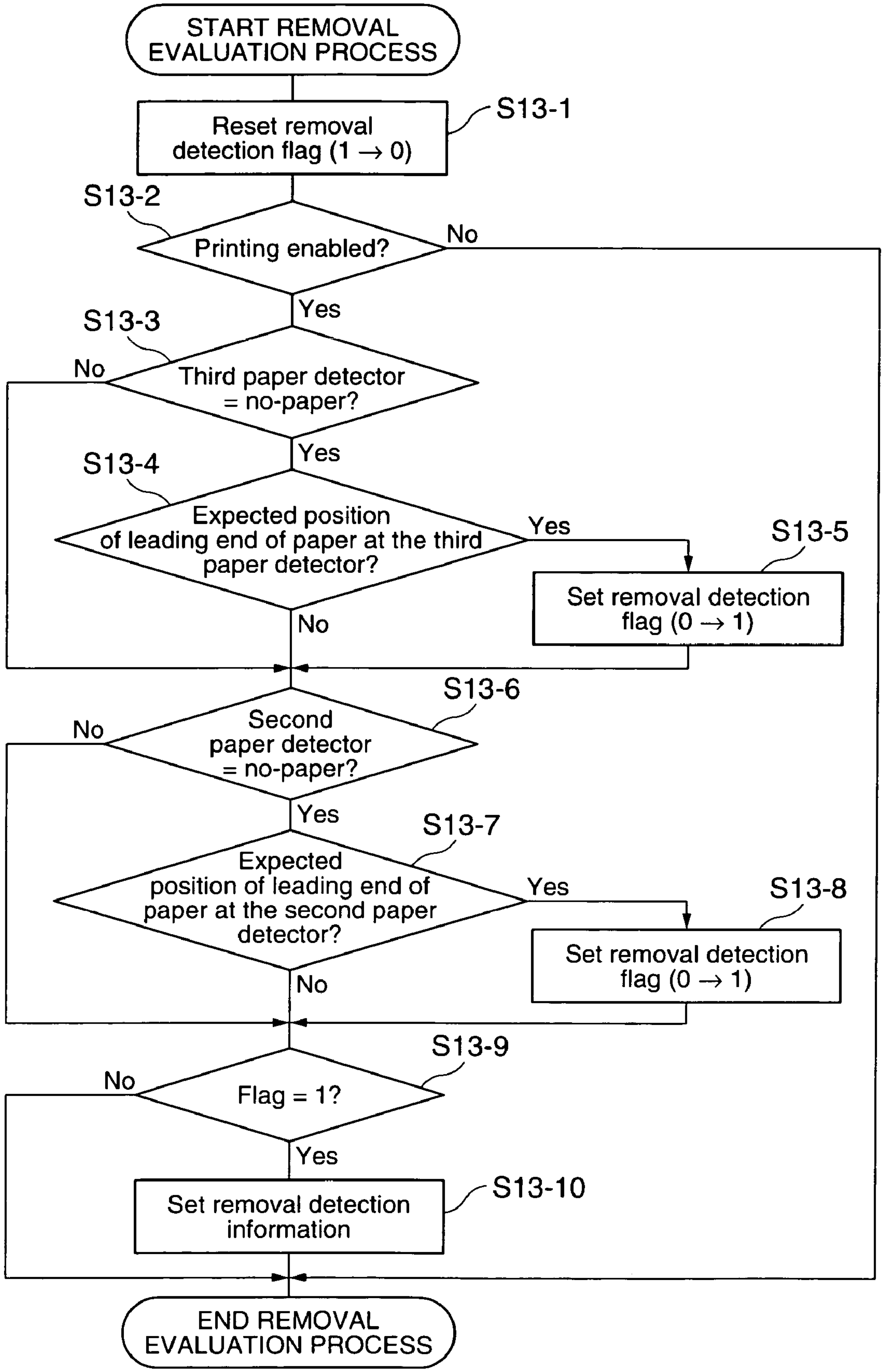
FIG. 8 is a flow chart of the media removal evaluation process that is executed after printing starts.
Figure 9:
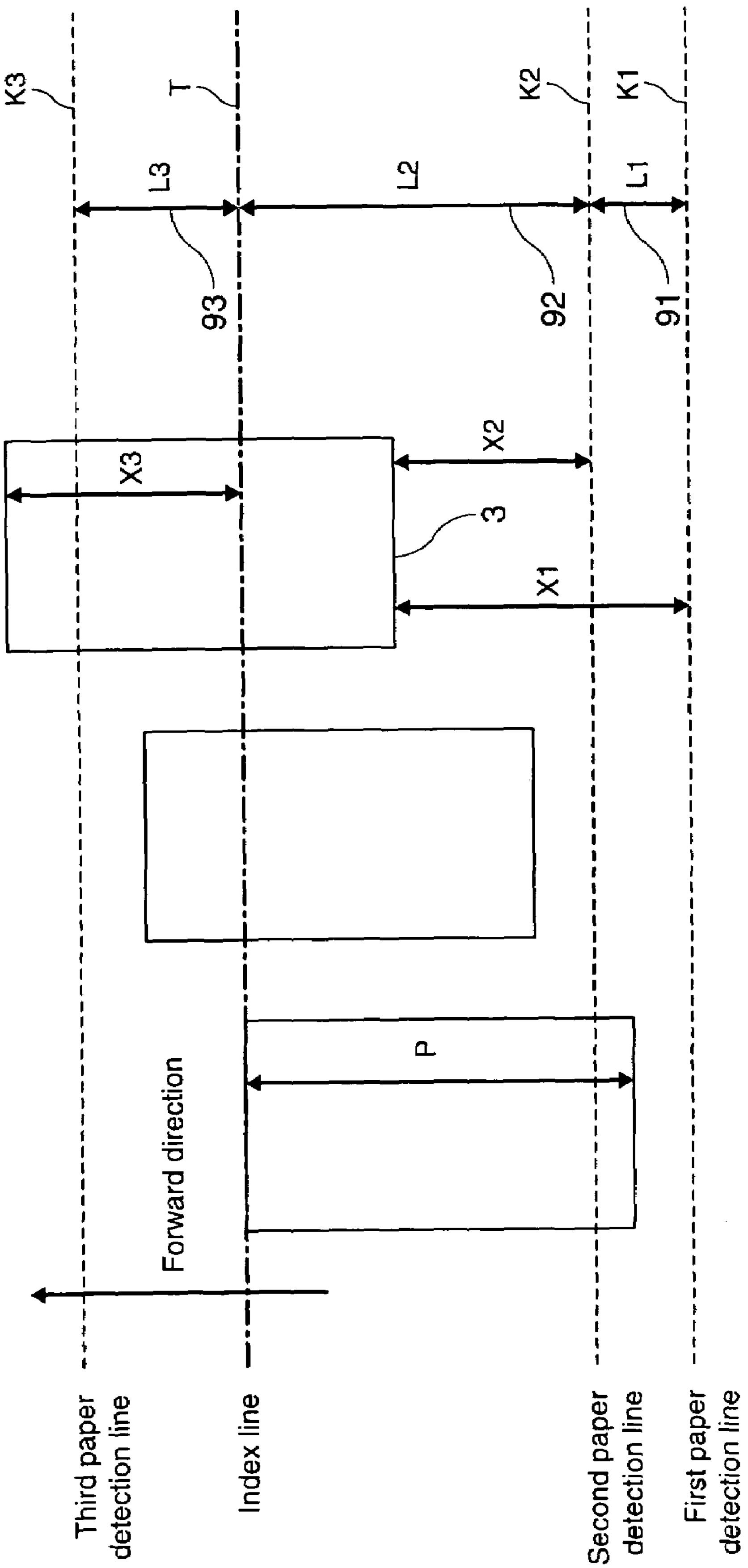
FIG. 9 describes the relationship between the paper 3 and the transportation path during the media removal evaluation process that is executed after printing starts.

FIG. 8 is a flow chart of the media removal evaluation process that is executed after saving the detection result as described above.

The media removal evaluation process starts with the control unit 82 resetting the removal detection flag (rewriting the current flag of 1 or 0 to 0) (S13-1). This removal detection flag is stored in storage area 83, for example.

The control unit 82 then determines if slip printing is possible (S13-2). If the leading end of the paper 3 is set to the paper indexing line T (S13-2 returns Yes), the control unit 82 confirms if the output from the third paper detector 19 indicates the no-paper state (S13-3).

If printing is not possible in step S13-2 (S13-2 returns No), the media removal evaluation process aborts.

If the control unit 82 determines in step S13-3 that the output of the third paper detector 19 indicates paper is present (S13-3 returns No), control skips to step S13-6.

However, if the control unit 82 determines in step S13-3 that the output of the third paper detector 19 indicates there is no paper (S13-3 returns Yes), the control unit 82 determines if the paper 3 is at a position that should be detected by the third paper detector 19 based on the paper transportation distance being counted (S13-4). If the leading end of the paper 3 has passed the detection position of the third paper detector 19, the paper 3 should be detected.

How far the medium has been conveyed and its position relative to the third paper detector 19 can be detected based on the position of the third paper detection line K3 and the result of paper transportation (either the transportation distance or transportation time) after the first or second paper detector 11 or 14 outputs the paper-detected signal (or no-paper signal), or based on the position of the third paper detection line K3 and the result of paper transportation (either the transportation distance or transportation time) from the paper indexing line T when printing starts without detecting removal of the paper 3.

If step S13-4 determines that the paper 3 should be detected by the third paper detector 19, or stated otherwise that the leading end of the paper 3 should be positioned at the third paper detection line K3 or further downstream therefrom in the transportation direction (S13-4 returns Yes) the combined results of steps S13-3 and S13-4 mean that the paper 3 should be detected by the third paper detector 19 but in fact is not detected (S13-3 returns Yes). As a result, the control unit 82 determines that the paper 3 was removed and thus sets the previously reset removal detection flag (0–>1) (S13-5).

If step S13-4 determines that the paper 3 should not be detected by the third paper detector 19 (S13-4 returns No), the result of step S13-4 conforms to the result of step S13-3 that the third paper detector 19 did not detect the paper. The control unit 82 therefore determines that the paper 3 is still present at this time and proceeds to step S13-6.

The control unit 82 reads the detection signal output by the second paper detector 14 (S13-6). If the detection signal from the second paper detector 14 confirms there is paper (S13-6 returns No), control goes to step S13-9.

However, if the detection signal from the second paper detector 14 confirms there is no paper (S13-6 returns Yes), the control unit 82 determines based on the paper transportation distance being counted if the paper 3 should be detected by the second paper detector 14 (the paper 3 is not detected by the second paper detector 14 if the trailing end of the paper 3 has passed the detection position of the second paper detector 14) (S13-7).

How far the medium has been conveyed and its position relative to the second paper detector 14 can be detected based on the position of the second paper detection line K2 and comparing the paper transportation distance after the first paper detector 11 outputs the no-paper signal with the distance between first paper detection line K1 and second paper detection line K2.

If the control unit 82 can determine the length of the paper 3 in the transportation direction based on information from the host computer, the timing at which the trailing end of the paper 3 passes the second paper detection line K2 can be determined based on how far the paper 3 is conveyed from the indexing position and the relationship between this length of the paper 3 and the indexing position, and can determine if the paper 3 should be detected at approximately this time.

Further alternatively, if the length of the paper 3 is unknown, the control unit 82 can be arranged to acquire the length of the paper 3 in the transportation direction based on the first paper detector 11 detecting the trailing end of the paper 3, the second paper detector 14 detecting the leading end of the paper 3, and the paper 3 feed distance.

If step S13-7 determines that the trailing end of the paper 3 should be detected by the second paper detector 14 (that is, the trailing end of the paper 3 should be positioned at or on the upstream side of the second paper detection line K2 in the forward direction) (S13-7 returns Yes), the combined results of steps S13-6 and S13-7 mean that the paper 3 should be detected by the second paper detector 14 but in fact is not detected (S13-6 returns Yes). As a result, the control unit 82 determines that the paper 3 was removed and thus sets the previously reset removal detection flag (0–>1) (S13-8).

If step S13-7 determines that the trailing end of the paper 3 should not be detected by the second paper detector 14 (S13-7 returns No), the result of step S13-7 conforms to the result of step S13-6 that the second paper detector 14 did not detect the paper. The control unit 82 therefore determines that the paper 3 is still present at this time and proceeds to step S13-9.

The control unit 82 then determines if the removal detection flag is set (=1) (S13-9). If the removal detection flag is set, the control unit 82 determines that the paper 3 has been removed at present and sets the removal detection information (S13-10). This removal detection information includes, for example, information denoting that the medium was removed and information indicating what print job was running when the paper was removed. In other words, step S13-9 in this embodiment of the invention determines that the medium was removed if the removal detection flag is set due to any change as a result of steps S13-3, S13-4, S13-6, or S13-7.

If printing ends without the removal detection information being set, the control unit 82 sends a status report indicating that printing ended to the host computer (not shown in the figure) connected to the printer. If the host computer stores the print data sent to the printer in memory or other storage area and receives this status report denoting the successful end of printing, the host computer clears the stored print data (the print data that was printed normally) from the storage area.

If the control unit 82 sets the removal detection information in step S13-10, however, the control unit 82 can also stop printing or transmit specific information (such as a printing failure status report or a request to resend the print data that was not completely normally printed because the medium was removed). If the host computer receives such specific information from the printer, the host can resend to the printer the print data (the print data stored in the specific area described above) that did not print normally because the paper was removed.

The host computer could be a personal computer, digital camera, or other type of terminal device.

The print data can be data to which a color conversion process, halftoning, or other specific process has been applied, or data to which no specific process is applied (such as a JPEG image file).

As described above, this aspect of this embodiment of the invention can detect if the print medium has been removed before printing starts even if the paper 3 is removed when the paper 3 is detected only by the second paper detector 14 by running the process described with reference to FIG. 4 to FIG. 6.

Furthermore, if the paper 3 is removed after printing starts, removal of the paper 3 can be detected and printing can be stopped by running the process described with reference to FIG. 7 and FIG. 8.

The invention can thus detect if the paper 3 has been removed both before and after printing starts even if the position of the paper that is detected by the paper detector is not upstream in the forward direction and near the position where the front print head 18 prints (the printing position). The incidence of printing even though there is no paper 3 can thus be reduced.

Another embodiment of the invention described above uses a method different from the method described in FIG. 4 to FIG. 6 to detect if the paper 3 was removed when the paper 3 is detected only by the second paper detector 14. Instead of inserting the paper 3 at once to the paper positioning line W beyond the second paper detection line K2, this embodiment of the invention transports the paper 3 from the upstream side to the downstream side of the first paper detection line K1.

The control unit 82 first calculates the length P of the paper 3 by calculating the distance travelled by the paper 3 from when the paper-detected signal is received from the first paper detector 11 until the no-paper signal is received from the first paper detector 11, that is, the distance travelled by the paper 3 from when the leading end of the paper 3 passes the first paper detection line K1 until the trailing end of the paper 3 passes the first paper detection line K1.

If the paper 3 is removed when the presence of the paper 3 is detected by both the first paper detector 11 and the second paper detector 14, both the first paper detector 11 and the second paper detector 14 will simultaneously detect that there is no paper 3, and removal of the paper 3 can thus be detected.

Furthermore, if the both the first paper detector 11 and the second paper detector 14 detect the presence of paper 3 and the trailing end of the paper 3 then passes the first paper detection line K1 without the paper 3 being removed, the first paper detector 11 detects that the paper 3 is not present but the second paper detector 14 continues to detect that the paper 3 is present. In this case, the control unit 82 calculates the distance P travelled by the paper 3 from when the first paper detector 11 first detects the paper 3 (outputs the paper-detected signal) until the first paper detector 11 no longer detects the paper 3 (outputs the no-paper signal) while the second paper detector 14 continues outputting the paper-detected signal.

The control unit 82 also calculates the distance Z travelled by the paper 3 from when the paper-detected signal from the second paper detector 14 is received until the no-paper signal is received. This distance Z can be updated according to the result of driving the feed motor 21.

The control unit 82 then compares the calculated length P of the paper 3 and the calculated distance Z at a specific time. This specific time can be, for example, when the leading end of the paper 3 is determined to be positioned at the indexing line T, or when the no-paper signal is received from the second paper detector 14.

If this comparison shows that P=Z, the control unit 82 determines that the paper 3 passed the second paper detection line K2 without being removed. If P>Z, the control unit 82 determines that the paper 3 was removed while passing the second paper detection line K2.

The invention has been described above with reference to a preferred embodiment of the invention and a variation thereof by way of example only, and it will be obvious to one with ordinary skill in the related art that the scope of the invention is not so limited and the invention can be varied in many ways without departing from the scope of the accompanying claims. The method of determining removal of a workpiece is not limited to being used in printing apparatuses, and more specifically can be applied to other technologies for detecting transportation of conveyed work.

The function of detecting that the paper 3 was removed (referred to below as the "removal detection function") in the preferred embodiments of the invention described above can be enabled or disabled in the printer using the operating unit (not shown in the figure) of the printer, or by a command sent from the host device (such as a personal computer, not shown in the figure) that sends the print data to the printer.

If the removal detection function is enabled and disabled by a command sent from the host, a command that controls enabling and disabling the removal detection function is sent from the host to the printer, and the printer runs the process controlled by the removal detection function if the removal detection function is enabled. If the removal detection function is disabled by this command, the printer does not run the media removal detection process and can thus be configured to not detect if the paper 3 is removed. If the removal detection function is enabled and removal of the paper 3 is detected, the printer can send a status report telling the host that the paper 3 was removed.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An apparatus for conveying work sequentially passed from a first position and second position to at least a specific position, comprising:

a first detector that detects if the conveyed work is or is not present at the first position;

a second detector that detects if the conveyed work that has passed or is passing the first position is or is not present at the second position;

a first calculator that calculates a first distance travelled by the conveyed work after the conveyed work is known from a detection result of the first detector to have passed the first position;

a second calculator that calculates a second distance travelled by the conveyed work after the conveyed work is known from a detection result of the second detector to have passed the second position; and an evaluator that determines, after the presence of the conveyed work is no longer detected at the second position, if the conveyed work was or was not removed when the conveyed work was present at least at the second position based on the calculated first travelled distance and the calculated second travelled distance.

2. The apparatus according to claim 1, wherein:

the first calculator calculates as the first travelled distance the distance the conveyed work moves from when the first detector stops detecting the conveyed work until the leading end of the conveyed work reaches the specific position;

the second calculator calculates as the second travelled distance the distance the conveyed work moves from when the second detector stops detecting the conveyed work until the leading end of the conveyed work reaches the specific position; and the evaluator compares the difference of the calculated first travelled distance minus the calculated second travelled distance with the gap between the first position and the second position, and determines that the conveyed work was removed if this difference is less than the gap.

3. The apparatus according to claim 2, wherein:

the length of the conveyed work along the transportation direction is shorter than the distance between the second position and the specific position; and the evaluator compares the difference and the gap when the leading end of the conveyed work is expected to reach the specific position.

4. The apparatus according to claim 1, further comprising:

a third detector that detects if the conveyed work that has passed or is passing a specific position is or is not present at a third position;

a third calculator that calculates a third distance travelled by the conveyed work referenced to the specific position; and a second evaluator that determines that the conveyed work was removed if the third detector does not detect the conveyed work even though the conveyed work is determined present at the third position based on the calculated third travelled distance.

5. The apparatus according to claim 1, further comprising:

a third calculator that calculates a third distance travelled by the conveyed work from the specific position; and a second evaluator that determines that the conveyed work was removed if the second detector does not detect the conveyed work even though the conveyed work is determined present at the second position based on the calculated third travelled distance and the length of the conveyed work in the transportation direction.

6. The apparatus according to claim 5, wherein the length of the conveyed work in the transportation direction is acquired based on detection results from the first detector and the second detector.

7. The apparatus according to claim 1, further comprising:

a second evaluator that determines that the conveyed work was removed if the second detector does not detect the conveyed work even though the conveyed work is determined present at the second position based on the calculated first travelled distance.

8. The apparatus according to claim 1, wherein:

the first calculator calculates the distance moved by the conveyed work from when the first detector detects the conveyed work to when the first detector stops detecting the conveyed work as the first travelled distance;

the second calculator calculates the distance moved by the conveyed work from when the second detector detects the conveyed work to when the second detector stops detecting the conveyed work as the second travelled distance; and the evaluator determines that the conveyed work was removed if the calculated second travelled distance is shorter than the calculated first travelled distance.

9. The apparatus according to claim 8, wherein the first detector is located downstream of the second detector in the transportation direction.

10. The apparatus according to claims 1, wherein:

the apparatus is connected to enable communication with a host device; and the evaluator determines if the conveyed work is or is not removed according to a command that is sent from the host device to enable or disable a removal detection function.

11. A method of conveying work sequentially passed a first position and second position to at least a specific position, comprising steps of:

detecting if the conveyed work is or is not present at the first position;

detecting if the conveyed work that has passed or is passing the first position is or is not present at the second position;

calculating a first distance travelled by the conveyed work when the conveyed work passes or has passed the first position;

calculating a second distance travelled by the conveyed work when the conveyed work passes or has passed the second position; and determining if the conveyed work was or was not removed when the conveyed work was present at the second position based on the calculated first travelled distance and the calculated second travelled distance after the presence of the conveyed work is no longer detected at the second position.

12. A method comprising steps of:

detecting if a conveyed work that was conveyed to a specific position and has passed or is passing the specific position is or is not present at a target position;

calculating a first travelled distance, which is the distance travelled by the conveyed work from the specific position; and determining that the conveyed work was removed if the conveyed work is not detected when the conveyed work is determined present at the target position based on the calculated first travelled distance.

13. The method according to claim 12, wherein the specific position is an indexing position of the conveyed work, and the target position is the detection position of a discharge detector that detects discharging the conveyed work.

14. The method according to claim 12, wherein the specific position and the target position are the detection position of a bottom-of-form detector that detects the trailing end of the conveyed work.

* * * * *